United States Patent [19]

Deng

[11] Patent Number: 5,862,134
[45] Date of Patent: Jan. 19, 1999

[54] SINGLE-WIRING NETWORK FOR INTEGRATED VOICE AND DATA COMMUNICATIONS

[75] Inventor: Shuang Deng, Sudbury, Mass.

[73] Assignee: GTE Laboratories Incorporated, Waltham, Mass.

[21] Appl. No.: 581,412

[22] Filed: Dec. 29, 1995

[51] Int. Cl.[6] .......................... H04L 12/66; H04L 12/28; H04L 12/56

[52] U.S. Cl. .......................... 370/352; 370/338; 370/389; 379/93.01; 379/93.09; 379/93.05

[58] Field of Search .................................. 370/389, 392, 370/352, 485, 338; 379/93, 100, 201, 90, 94, 243, 229, 230, 93.01, 93.09, 93.08, 93.14, 93.29, 100.11, 100.13, 93.05

[56] References Cited

U.S. PATENT DOCUMENTS

| | | | |
|---|---|---|---|
| 4,771,425 | 9/1988 | Baran et al. | 370/458 |
| 4,969,184 | 11/1990 | Gordon et al. | 379/100.13 |
| 5,448,635 | 9/1995 | Biehl et al. | 379/399 |
| 5,526,353 | 6/1996 | Henley et al. | 370/392 |
| 5,608,786 | 3/1997 | Gordon | 370/352 |

OTHER PUBLICATIONS

Yang, C., "RFC 1789: INETPhone—Telephone Services and Servers on Internet." Apr. 1995. <http://ds.internic.net/rfc/rfc 1789.txt>(12 Feb. 1997).

Casner, S., et al. "RFC 14ZZ: Ingegrated Service in the Internet Architecture." Sep. 1993.

Clark, D., et al. "Supporting Real–Time Applications in an Integrated Services Packet Network–Architecture and Mechanism." ACM COMM '92–Aug. 1992.

McNinch, B., "Screen–Based Telephony." IEEE Communications Magazine, Apr. 1990.

Schmandt, C. and S. Casner, *Phonetool: Integrating Telephones and Workstations in Globecom '89*, 1989, pp. 970–974.

Zellweger, P.T., D.B. Terry, and D.C. Swinehart. *An Overview of the Etherphone System and Its Applications* in the Second IEEE Conference on Computer Workstations, 1988, pp. 160–168.

Robinson, B., "Telephone Services Make Their Way onto the LAN", in *Network World*, 1993, p. 19.

Linkon Corporation "FCC—3000 Direct Driver Interface Guide", Alpha Release 4.8.2, May 27, 1994.

*Primary Examiner*—Jason Chan
*Assistant Examiner*—Melissa Kay Carman
*Attorney, Agent, or Firm*—Leonard Charles Suchyta; Floyd E. Anderson

[57] ABSTRACT

An integrated network for connecting both telephones and personal computers within an organization, using a single wiring connection is disclosed. Telephones and personal computers within the organization are connected to the same local area network (LAN) which is in turn connected to a telephony-computer interface (TCI). The TCI is also connected to telephone lines. The TCI forms an interface between telephone line communications and data packets for real time communications. In this way, only one wiring connection, the local area network, need be installed to interconnect both telephones and personal computers, for both local and off-site communications.

10 Claims, 3 Drawing Sheets

SINGLE-WIRING NETWORK FOR INTEGRATED VOICE AND DATA COMMUNICATIONS

FIELD OF THE INVENTION

The present invention relates, generally, to a local area network for connecting computers within an organization. The network supports both data and voice communication.

BACKGROUND OF THE INVENTION

Within an organization, such as a research facility, governmental agency or any general office setting, a local area network (LAN) is provided for connecting personal computers located throughout the organization to enable data sharing between the personal computers. Such local area networks are well known and require a dedicated set of wiring connections to interconnect each personal computer to the LAN.

Within such an organization, it is also common to connect a plurality of telephones together into a local public branch exchange (PBX) telephone network, so that it is not necessary to provide each person in the organization with their own private phone line, which would be quite expensive. Such local PBX telephone networks also require a dedicated set of wiring connections to interconnect each telephone to the local PBX telephone network.

The need for two separate sets of wirings, one for connecting only personal computers and the other for connecting only telephones can be quite costly in terms of installation fees, maintenance fees and equipment costs.

Further, new multimedia personal computers now contain integrated equipment, such as microphones and loudspeakers, for performing standard telephone functions, such as allowing the user to speak into the microphone for voice communication with a remote party. If such a multimedia personal computer is connected to the LANs discussed above, it would still be necessary to have a separate telephone. That is, the local PBX telephone network requires a special telephone to be connected thereto so these multimedia personal computers cannot be connected to the local PBX telephone network. Therefore, these new multimedia personal computers cannot be used for voice communication purposes with the present state of networking technology.

The prior art EtherPhone® network of Xerox® Corporation enables local telephone voice communication (i.e., calls originating from and destined to a location within the organization) to take place over a dedicated LAN by using packet-switching technology. However, any calls originating from or destined to a location outside of the organization must take place over a local PBX telephone network with its separate wiring network as discussed above. Further, data communications require a third set of wiring (another LAN). Thus, the EtherPhone network involves three sets of wirings and suffers from the above problems associated with such added complexity.

SUMMARY OF THE INVENTION

The present invention is directed to an integrated network for connecting both telephones and personal computers within an organization, using a single wiring connection.

Specifically, telephones and personal computers within the organization are connected to the same local area network (LAN) which is in turn connected to a telephony-computer interface (TCI). The TCI is also connected to telephone lines. The TCI forms an interface between telephone line communications and data packets for real time communications.

In this way, only one wiring connection, the local area network, need be installed to interconnect both telephones and personal computers, for both local and off-site communications.

DETAILED DESCRIPTION OF THE PREFERRED EMBODIMENTS

Figure 1:
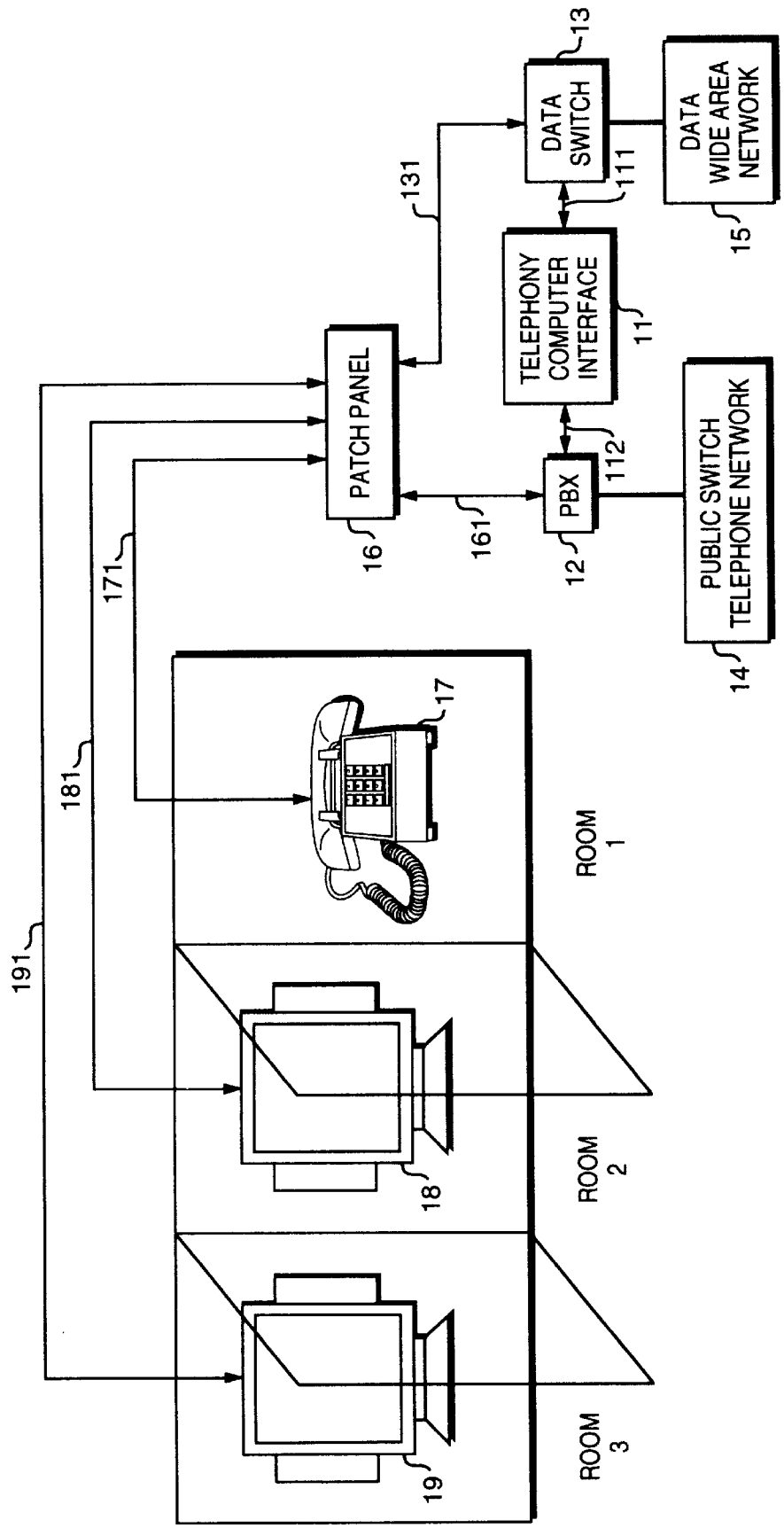
FIG. 1 is a block diagram of the integrated network according to a preferred embodiment of the present invention.

In the preferred embodiment of the present invention, as illustrated in block diagram form in FIG. 1, multimedia personal computers 18 and 19, as well as telephone 17 (each located, in different rooms or offices within an organization) are connected to patch panel 16 through a LAN (171, 181, 191). The telephone 17 is connected to the LAN using, for example, the EtherPhone® technology described above so that speech data can be converted to LAN packet form.

Patch panel 16 is connected to data switch 13 via LAN cable 131. Data switch 13 is in turn connected to data wide area network 15 for transmitting packet data outside of the organization (e.g., E-mail being sent to a party outside of the organization over the Internet) and receiving packet data originating from outside the organization. Data switch 13 is also connected to telephony computer interface 11, via LAN cable 111. The LAN is actually composed of data switch 13 and LAN cables 131, 181 and 191. Cable 171, connected to telephone 17, uses the EtherPhone® technology and is thus not part of the LAN in a conventional sense. However, in this disclosure the "LAN" wiring will include wiring 171.

Telephony computer interface 11 is connected to the organization's local PBX (public branch exchange) telephone network 12 via telephone cable 112, which is in turn connected to public switch telephone network 14, for routing calls outside of the organization over the public telephone lines. Telephone cable 161 is used to connect patch panel 16 directly to PBX 12. This latter path is used for connecting telephones via a conventional PBX network into offices (not shown in FIG. 1) which are not connected to the LAN. This latter path is taken by voice-only users.

As is apparent from FIG. 1, for offices assigned to users of both voice and data communications, only a single set of wiring connections (the single LAN connection (171, 181, 191)) is required to interconnect both voice and data equipment. This provides advantages in terms of reduced maintenance fees and installation fees. Further, because it is not necessary to place a telephone in rooms where a multimedia computer is located (e.g., rooms 2 and 3 in FIG. 1), equipment costs can be lowered.

The telephony computer interface (TCI) 11 performs the function of converting LAN packet data to telephone signals and vice versa. For example, telephone calls originating from outside the organization come in from public switch telephone network 14 to the organization's local PBX 12, and are then passed on to TCI 11 over telephone cable 112. TCI 11 contains a telephone interface such as the FC3000 card by LINKON® Corporation for sending and receiving telephone data over telephone cable 112. After converting the telephone data to LAN packets and determining which computer or telephone the call is directed to, the LAN packet data is sent out through a standard Ethernet card of TCI 11 to data switch 13 for routing, through patch panel 16 to the appropriate personal computer or telephone.

The operation of the preferred embodiment will now be described in more detail in conjunction with the flowcharts of FIGS. 2 and 3.

Figure 2:
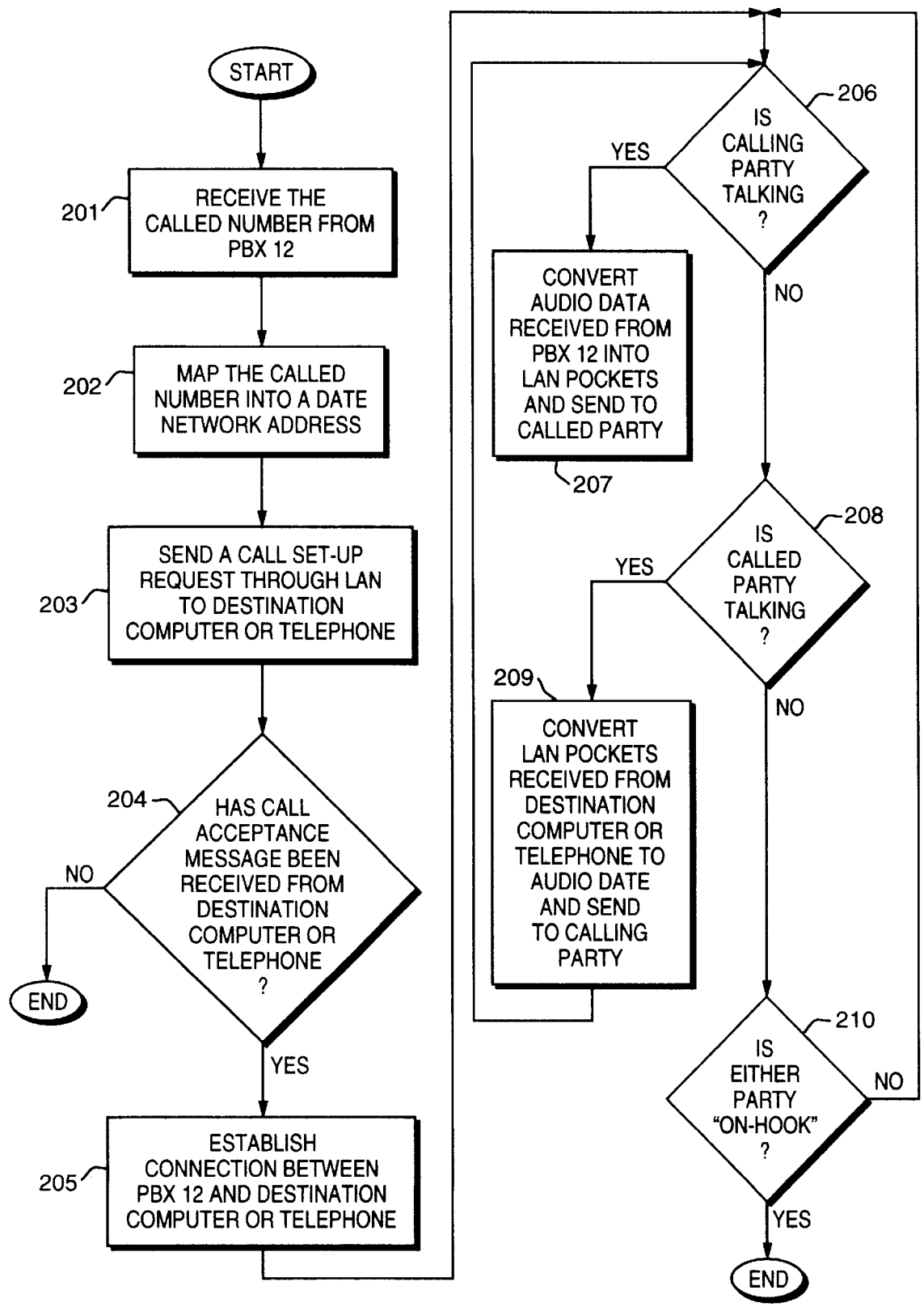
FIGS. 2 and 3 are flowcharts showing the operational steps performed by the Telephony Computer Interface according to a preferred embodiment of the present invention.

FIG. 2 is a flowchart showing the steps which the TCI 11 performs when a telephone call comes in through public switch telephone network 14 destined for a particular user 17–19 within the organization. TCI 11 could include, for example, a programmed computer which performs the following program steps.

First, TCI 11 receives (at step 201) the telephone number from PBX 12 of the personal computer or telephone (called party) within the organization that the calling party is attempting to reach. Then, at step 202 TCI 11 maps the called number into a local area network address (such as an Ethernet or Internet Protocol address) corresponding to the called party. Then, at step 203 TCI 11 sends a call set-up request through the LAN to the called party, in order to request that the called party prepare for receiving a call. At step 204 TCI 11 checks whether a call acceptance message has been received from the called party. If it has not been received within a predetermined period of time, it is assumed that the called party is not prepared to accept a call (perhaps it is not functional) and the program ends. If the called party has sent a call acceptance message, a communications connection is established by TCI 11 between PBX 12 and the called party at step 205.

Once a communications connection is established TCI 11 performs a continuous check to determine whether each party is talking. TCI 11 checks to determine whether the calling party is talking at step 206. If the calling party is talking, the audio data received by TCI 11 over PBX 12 from the calling party is converted into LAN packets and sent to the called party at step 207. After step 207, program flow goes back to step 206. If the calling party is not determined to be talking at step 206, TCI 11 checks to determine whether the called party is talking at step 208. If the called party is determined to be talking, the LAN packets corresponding to such speech are converted to audio data by TCI 11 and sent to PBX 12 for transmission over public switch telephone network 14 to the calling party at step 209. After step 209, program flow goes back to step 206. At step 208 if it is determined that the called party is not talking, it is checked whether either party is "on-hook" at step 210. That is, TCI 11 determines whether either party has "hung up", thus indicating an intent to terminate communication with the other party. If either party is determined to be "on-hook", the program ends. If neither party is determined to be "on-hook", control loops back to step 206.

Figure 3:
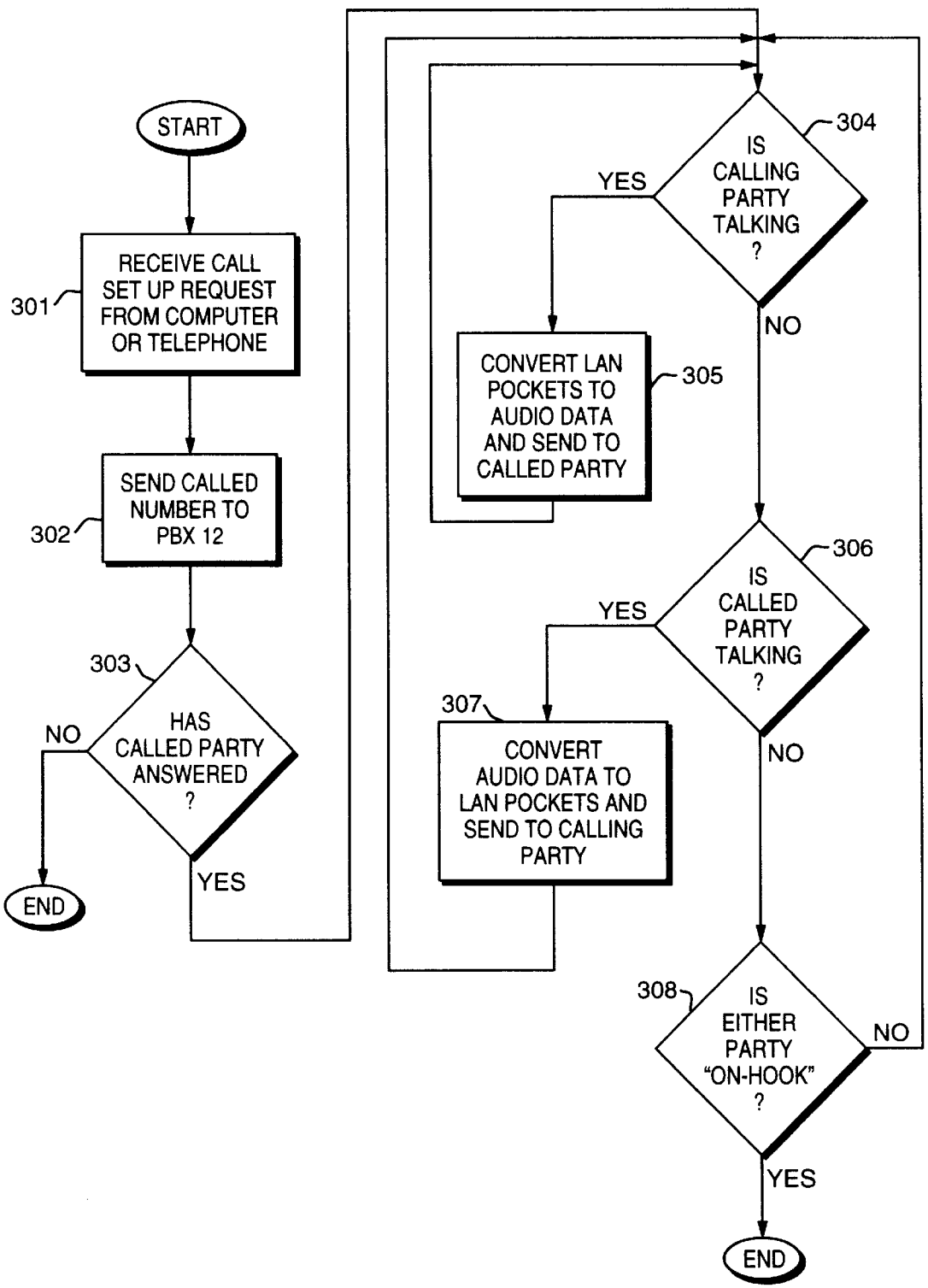

FIG. 3 shows the program flow performed by TCI 11 when a personal computer 18 or 19 or a telephone 17 located within the organization wishes to make a telephone call to an outside party.

First, at step 301 TCI 11 receives a call set up request from the computer or telephone (calling party) wishing to make a call. This call set up request includes the outside telephone number of the party which the calling party wishes to call TCI 11 then at step 302 sends the called number to the PBX 12's phone line over telephone cable 112. At step 303 TCI 11 determines whether the called party has answered, based on audio data received over public switch telephone network 14 and PBX 12. If the called party has not answered then the program ends.

If the called party answers then control goes to a continuous check routine where TCI 11 determines whether each party is talking. TCI 11 checks to determine whether the calling party is talking at step 304. If the calling party is talking, the LAN data received by TCI 11 from the calling party is converted into audio data and sent to the called party at step 305. After step 305, program flow goes back to step 304. If the calling party is not determined to be talking at step 304, TCI 11 checks to determine whether the called party is talking at step 306. If the called party is determined to be talking, the audio data corresponding to such speech is converted to LAN data packets by TCI 11 and sent to the calling party at step 307. After step 307, program flow goes back to step 304. At step 306 if it is determined that the called party is not talking, it is checked whether either party is "on-hook" at step 308. If either party is determined to be "on-hook", the program ends. If neither party is determined to be "on-hook", control loops back to step 304.

In addition to the operations described above which are executed by TCI 11, each multimedia personal computer 18 and 19 must perform the operations to be described below in order to perform the operations described above.

When a multimedia personal computer is used to originate a call to an outside user, the multimedia personal computer first forms a call set-up request which includes the telephone number of the called party. This call set-up request is then forwarded to TCI 11 on the LAN. Once communication has been established with the PBX 12 via TCI 11, the multimedia personal computer receives audio packets over the LAN (such audio packets corresponding to speech originating from the called party at the other end of the public switch telephone network 14) and plays out the audio content of these packets on an audio output device (loudspeaker or headphones) of the multimedia personal computer. Also, in order to send audio data to the called party, the multimedia personal computer receives audio data from an audio input device (e.g., a microphone), forms LAN packets out of such audio data and transmits them over the LAN to TCI 11.

Each multimedia personal computer also performs the function of forming an "on-hook" message and sending it to TCI 11 when the user issues an instruction that he/she wishes to end the call. Further, the personal computer terminates the call when it receives an "on-hook" message from TCI 11. Finally, each personal computer receives a call set-up request from the TCI 11 and notifies the user of same via a visual or audio indication.

In order to provide the ability to perform the above operations, each personal computer is provided with dedicated software which includes the instruction steps necessary to perform these operations. For example, in order to form the LAN packets from speech data inputted via the multimedia computer's microphone, software such as that included in the Etherphone® is used.

Further, the PBX 12 performs the following operations in order to allow the operations discussed above to be performed. The PBX 12 is provided with dedicated software which includes the instruction steps necessary to perform such operations.

PBX 12 maintains a record of whether each telephone number which is received from the public switch telephone network 14 during an incoming call is assigned to a conventional telephone connected to a conventional PBX telephone wiring network (not shown in FIG. 1) or equipment connected directly to the LAN (a multimedia personal computer 18 or 19 or a telephone 17). If the telephone number associated with incoming call is directed to equipment connected directly to the LAN, PBX 12 routes the call to TCI 11 over telephone cable 112. That is, PBX 12 passes the called number to the TCI 11 as part of the call set-up signalling. On the other hand, if the incoming call is directed to a telephone connected to a conventional PBX telephone wiring network, PBX 12 routes the call to patch panel 16 via telephone cable 161.

The invention is not to be limited by the above-disclosed embodiments but only by the spirit and scope of the appended claims. That is, many other embodiments are contemplated which are not described above. For example, the system can be used without a PBX 12. In this latter case, the TCI 11 would be connected directly to the public switch telephone network 14. The LAN network can be wireline or wireless. The LAN wiring can be a shared bus topology or any other known topology.

What is claimed is:

1. An apparatus connecting at least one data based apparatus and at least one speech based communications apparatus in a local area network through a single communications line comprising:
   a data switch selectably electrically interconnecting said at least one data based apparatus to a data wide area network; and
   a telephony computer interface selectably electrically interconnected to said data switch and electrically interconnected to a PBX, said data switch configured to selectably electrically interconnect said at least one speech based communications apparatus to said PBX routing telephone signals outside said local area network, said telephony computer interface converting telephone signals from said PBX into LAN packet data and transmitting said LAN packet data selectively to one of said at least one data based apparatus and said at least one speech based communications apparatus and said telephony computer interface converting LAN packet information into one of voice data and digital data and transmitting said voice data to said PBX for transmission to a public switch telephone network, and transmitting said digital data through said data switch to said data wide area network.

2. The apparatus of claim 1 wherein said data-based apparatus are computers transmitting digital data.

3. The apparatus of claim 1 wherein said speech based apparatus are telephones.

4. The apparatus of claim 1 wherein said data based apparatus and said speech based apparatus are combined in computers transmitting digital data and speech data.

5. The apparatus of claim 1 further comprising a patch panel interconnecting said at least one data based apparatus and said at least one speech based communications apparatus to said data switch.

6. The apparatus of claim 1 wherein said at least one speech based apparatus converts speech signals into LAN packet data and LAN packet data into speech signals.

7. A network of claim 1 wherein said telephony computer interface includes a LAN interface converting telephone signals into LAN packet data and converting LAN packet data into telephone signals.

8. A method of routing telephonic voice data and computer data through a single communications line electrically connected to each of a plurality of data based and speech based communications apparatus which are part of a local area network to external data based and speech based communications apparatus comprising the steps of:
   sending an internal telephonic voice data and computer data as LAN packet information from each of said plurality of data based and speech based communications apparatus;
   receiving said LAN packet information at a telephony computer interface;
   converting said LAN packet information into telephonic voice data and computer data at said telephony computer interface, said step of converting said LAN packet information comprising the steps of,
      converting said LAN packet information into telephonic voice data and sending said telephonic voice data to a PBX for transmission over public switched telephone network to a calling party; and
      converting said LAN packet information into computer data and sending said computer data through a data switch to a data wide area network;
   sending said telephone voice data and computer data to an external data based or speech based communications apparatus;
   receiving external telephonic voice data and computer data at said telephony computer interface;
   converting external telephonic voice data and computer data into LAN packet information; and
   sending said LAN packet information to an internal data based or speech based communications apparatus.

9. The method of claim 8 wherein said telephony computer interface in said step of converting external telephonic voice data and computer data into LAN packet information performs the steps of:
   receiving said external telephonic voice data at said telephony computer interface through said PBX;
   transferring said external telephonic voice data from said PBX to said telephony computer interface;
   converting said external telephone voice data into said LAN packet information; and
   routing said LAN packet information through said data switch to said speech based communications apparatus in said local area network.

10. A local area network for connecting a plurality of data based and speech based apparatus each through a single communications line to an outside communications network comprising:
   a patch panel electrically interconnected to said plurality of data based and speech based apparatus through local area network cables;
   a data switch electrically interconnected to said patch panel and selectably electrically connected to a data wide area network;
   a telephony computer interface selectably electrically interconnected to said data switch and electrically interconnected to a local PBX, said telephony computer interface converting telephonic voice data from said local PBX into LAN packet information and transmitting said LAN packet information through said data switch for routing through said patch panel to a selected one of said plurality of data based and speech based apparatus, said telephony computer interface converting LAN packet information into one of voice data and digital data and transmitting said voice data to said local PBX for transmission to a public switch telephone network, and transmitting said digital data through said data switch to said data wide area network.

* * * * *